United States Patent [19]

Baer et al.

[11] 3,880,940

[45] Apr. 29, 1975

[54] MANUFACTURE OF ALIPHATIC ALCOHOLS

[75] Inventors: Karl Baer, Weinheim; Heinrich Elliehausen, Ludwigshafen; Heinz Hohenschutz, Mannheim; Max Strohmeyer, Limburgerhof; Guenter Zirker, Ludwigshafen, all of Germany

[73] Assignee: BASF Aktiengesellschaft, Ludwigshafen (Rhine), Germany

[22] Filed: Nov. 21, 1973

[21] Appl. No.: 418,070

[30] Foreign Application Priority Data
Nov. 24, 1972 Germany............................. 2257673

[52] U.S. Cl........... 260/639 HF; 252/451; 252/458; 260/638 A; 260/638 B; 260/643 B; 260/643 F
[51] Int. Cl.............................................. C07c 29/14
[58] Field of Search......... 252/451, 458; 260/638 B, 260/638 HF

[56] References Cited
UNITED STATES PATENTS

| | | | |
|---|---|---|---|
| 2,645,619 | 7/1953 | Hoekstra............................. | 252/451 |
| 2,699,376 | 1/1955 | Hay..................................... | 252/451 |
| 3,321,534 | 5/1967 | Landgraf et al.................. | 260/638 B |
| 3,652,215 | 3/1972 | Aboutboul et al................. | 252/451 |
| 3,652,457 | 3/1972 | Jaffe.................................... | 252/451 |

FOREIGN PATENTS OR APPLICATIONS 1,203,235   6/1966   Germany..................... 260/638 HF

*Primary Examiner*—Joseph E. Evans
*Attorney, Agent, or Firm*—Johnston, Keil, Thompson & Shurtleff

[57] ABSTRACT

Manufacture of saturated aliphatic alcohols by hydrogenation of saturated aliphatic aldehydes at temperatures of from 140° to 230°C at pressures of from 50 to 350 atmospheres in the presence of catalysts containing from 5 to 15% by weight nickel and 5 to 20% by weight molybdenum supported on silicic acid, in which process catalysts are used which have been obtained by heating silicic acid carrier materials to temperatures of from 700° to 1200°C, impregnating the resulting silicic acid carrier materials with nickel and molybdenum salts, drying the resulting material with or without further heating to temperatures of from 200° to 500°C and subsequently treating the product with hydrogen at elevated temperature in conventional manner. The alcohols obtained are used as solvents or for the manufacture of plasticizers for polyvinyl chloride.

9 Claims, No Drawings

MANUFACTURE OF ALIPHATIC ALCOHOLS

The present invention relates to an improved process for the manufacture of aliphatic alcohols by hydrogenation of saturated aliphatic aldehydes in the presence of catalysts containing nickel and molybdenum supported on silicic acid.

A process is known from German Pat. No. 1,222,905 in which butyraldehyde-containing mixtures are hydrogenated in the presence of catalysts containing nickel and molybdenum supported on silicic acid, which catalysts have been manufactured by impregnation of silicic acid carrier materials with salts of the metals. This process has the disadvantage that the activity of the catalysts leaves much to be desired on account of the relatively low metal content and the life and mechanical stability of the catalyst are not satisfactory. From German Pat. No. 1,203,235 it is known to use catalysts containing nickel and molybdenum supported on silicic acid, which catalysts have been manufactured by coprecipitation of the catalytically active metals on the carrier, for the hydrogenation of reaction mixtures containing butyraldehyde. These catalysts, too, do not satisfy the requirements in respect of mechanical stability and activity. Moreover, the catalysts become inactive if they are heated above the usual hydrogenation temperatures to temperatures of, for example, 450°C, as may occur with unusual operating conditions.

It is an object of the present invention to provide a process in which the catalysts used possess a longer life and improved mechanical stability. It is a further object of the invention to provide a process in which the catalysts have superior activity, even at a relatively low active metal content, for the cracking of high-boiling components which are present in oxo reaction mixtures. It is yet another object of the present invention to provide a process in which the catalysts are not sensitive to over-heating.

These and other objects and advantages of the invention are achieved by a process for the manufacture of saturated aliphatic alcohols by hydrogenation of saturated aliphatic aldehydes at temperatures of from 140° to 230°C at pressures of from 50 to 350 atmospheres in the presence of catalysts containing from 5 to 15% by weight nickel and from 5 to 20% by weight molybdenum supported on silicic acid, in which process catalysts are used which have been obtained by heating silicic acid carrier materials to temperatures of from 700° to 1200°C, impregnating the resulting silicic acid carrier materials with nickel and molybdenum salts, drying the resulting material with further heating to temperatures of from 200° to 500°C and subsequently treating the product with hydrogen at elevated temperature.

Preferred starting materials are alkanals of 2 to 20 carbon atoms, particularly 3 to 14 carbon atoms. Aldehyde-containing mixtures such as are formed in the hydroformylation of olefins of from 2 to 12 carbon atoms are particularly preferred. Butyraldehyde has achieved special significance, particularly in the form of oxo reaction mixtures which, besides butyraldehyde, contain byproducts from the oxo reaction such as acetals, esters and ethers. Typical mixtures contain, for example, 4 to 80% by weight butyraldehyde, 10 to 55% by weight butanols, 3 to 10% by weight esters of carboxylic acids of 1 to 4 carbon atoms, 0.1 to 2% by weight acetals, 0.2 to 1% by weight ethers and ketones as well as 10 to 35% by weight high-boiling materials such as are formed in the oxo reaction. Suitable alkanals include propionaldehyde, acetaldehyde, butyraldehyde, octanal, nonanal, decanal and aldehyde mixtures such as are formed in the hydroformylation of olefin fractions of 8 to 10 carbon atom olefins or 10 to 12 carbon atom olefins.

The hydrogenation is carried out at temperatures of from 140° to 230°C. Temperatures of from 150° to 220°C have been found to be especially suitable. In addition, pressures of from 50 to 350 atmospheres, advantageously from 100 to 300 atmospheres, are used for the hydrogenation.

The hydrogenation is carried out in the presence of supported catalysts containing from 5 to 15% by weight nickel and from 5 to 20% by weight molybdenum, based on carrier material plus active components, supported on silicic acid carrier material, which catalysts have been obtained by heating silicic acid carrier materials to temperatures of from 700° to 1200°C, impregnating the resulting silicic acid carrier materials with nickel and molybdenum salts, drying the resulting material with or without further heating to temperatures of from 200° to 500°C and subsequently treating the product with hydrogen at elevated temperature in conventional manner. Preferred catalysts are those in which the molybdenum content is from 1 to 5% by weight higher than the nickel content.

Advantageously, the silicic acid carrier materials which are used have been obtained by precipitation of silicic acid from sodium silicate solutions, e.g. by decomposition of a sodium water glass solution from 1 to 5 molar in $SiO_2$, optionally with the addition of from 0.1 to 0.2 times the amount of a 15 to 25% by weight ammonia solution and subsequent introduction of a 10 to 30% by weight, preferably 15 to 20% by weight strong mineral acid, advantageously sulfuric acid, sufficient to produce a pH of from 6 to 7, care being taken to ensure that an alkaline pH is maintained during the precipitation and that the pH does not fall below the specified value. The precipitated silicic acid is then washed, dried and molded in conventional manner, e.g. pelleted. The resulting silicic acid carrier materials are heated to temperatures of from 700° to 1200°C, advantageously to temperatures of from 1000° to 1100°C, e.g. for a period of for example 1 to 6 hours. Annealing temperatures and periods are selected so that the pellets obtained after the annealing have a water uptake of advantageously from 0.5 to 1.0 cm³/g, preferably from 0.5 to 0.6 cm³/g. Silicic acid carrier materials obtained in this way have, as a rule, an internal surface area of from 30 to 70 m²/g and a pore radius of from 150 to 300 A.

The resulting silicic acid carrier materials are then impregnated with nickel and molybdenum salts which can be converted into their oxides by heating, e.g. nitrates, chlorides or organic carboxylic salts such as formates. Suitable salts are, for example, nickel nitrate, nickel chloride and ammonium molybdate. For the impregnation the salts are, as a rule, used in aqueous solution, e.g. in 0.5 to 2M solutions. Preferably, ammoniacal solutions of the metal salts mentioned above are used.

The impregnated silicic acid carrier materials are dried, e.g. for 8 to 15 hours at temperatures of from 100° to 160°C. Advantageously, the drying of the impregnated pellets is linked with a further heat treatment step at temperatures of from 200 to 500, preferably 250° to 350°C, e.g. for a period of 5 to 20 hours.

It has been found to be particularly advantageous if the desired quantity of nickel and molybdenum is applied to the silicic acid carrier not in a single step, but in a plurality of steps, for example from 2 to 4 steps, with metal salts of the type mentioned above. Preferably, the impregnated silicic acid carrier material is dried and optionally heat treated after each impregnation step.

The catalysts are treated with hydrogen at elevated temperatures, e.g. 140° to 200°C, and under pressures of 50 to 300 atmospheres before use.

The process of the present invention can be carried out, for example, as follows: The catalysts described are arranged as a fixed bed in a hydrogenation zone which preferably has an L:D ratio of from 12:1 to 20:1, and aldehyde and hydrogen are passed downwardly from above 1.1 to 1.3 moles of hydrogen being advantageously used per mole of aldehyde to be hydrogenated. The reaction is carried out at the temperatures specified above, preferably using a linear velocity of 15 to 35 m/hour and a space velocity of 0.5 to 1.4 kg of aldehyde per kg of catalyst. The reaction mixture leaving the hydrogenation zone is separated into its constituent phases, the excess hydrogen being advantageously recycled, and the crude hydrogenated product is purified in conventional manner, e.g. by fractional distillation.

The alcohols manufactured by the process of the invention are solvents or detergent base materials or are suitable for the production of plasticizers.

The process of the present invention is illustrated by the following Examples, in which the parts by volume are related to the parts by weight in the same way as the liter to the kilogram.

EXAMPLE 1

760 parts by volume of 17% sulfuric acid are allowed to run during ninety minutes into 1000 parts by volume of sodium waterglass having a density of 1.18 and containing 13% by weight silicon dioxide. After filtration and washing, the resulting paste is dried to an ignition loss of 10% and extruded in known manner to pellets 6 mm in diameter and 20 to 30 mm long. The pellets are dried for 24 hours at 250°C, then calcined for 5 hours at 1000°C. The carrier material has a water uptake of 0.6 cm$^3$/g. The internal surface area is 50 m$^2$/g and the pore radius is 200 A.

1300 parts by volume of 25% by weight aqueous ammonia solution are placed in a stirred vessel, 390 parts by weight of nickel carbonate and 300 parts by weight of molybdenum trioxide are added thereto and gaseous ammonia is introduced until a clear solution results.

The pellets described above are impregnated with the metal salt solution, separated from the excess solution, dried for 15 hours at 100°C and calcined for 10 hours at 300°C. The resulting intermediate is analyzed and further treated with an amount of the impregnation solution such that the finyl catalyst contains 7.75% nickel and 11.8% molybdenum trioxide. It is then again dried and calcined as described above.

EXAMPLE 2

To 1000 parts by volume of sodium waterglass having a density of 1.18 and containing 13% by weight of silicon dioxide there are added firstly 150 parts by volume of 25% by weight aqueous ammonia solution and then, within a period of ninety minutes, 760 parts by volume of 17% by weight sulfuric acid. After filtration and washing, the resulting paste is dried to a loss on ignition of 10% and extruded in known manner into pellets 6 mm in diameter and 20 to 30 mm long. The pellets are dried for 24 hours at 250°C and then calcined for 3 hours at 1100°C.

1300 parts by volume of 25% by weight aqueous ammonia solution are placed in a stirred vessel, 390 parts by weight of nickel carbonate and 350 parts by weight of molybdenum trioxide are added thereto and gaseous ammonia is introduced until a clear solution results.

The pellets described above are completely impregnated with the metal salt solution, separated from the excess solution, dried for 15 hours at 100°C and calcined for 15 hours at 300°C. This intermediate is analyzed and further treated with a quantity of the impregnation solution such that the final catalyst contains 7.75% nickel and 13.75% molybdenum trioxide = 9.0% Mo. Thereafter, it is again dried and calcined as described above.

EXAMPLE 3

400 ml/hr of a mixture of 2% by weight butyl acetals, 5.4% by weight butyraldehydes, 9.5% by weight butyl formates, 55.6% by weight butanols and 27.5% of high-boiling residue are trickled through a high-pressure tube of 1-liter capacity at 190°C and a hydrogen pressure of 270 atmospheres gauge, the tube containing a packing of 0.8 liter of the catalyst manufactured according to Example 1. The hydrogenation effluent contains 83.0% by weight butanols. The high-boiling residue has been reduced to 16.6% by weight.

EXAMPLE 4

800 ml/hr of the mixture described in Example 3 are treated under the conditions specified in that Example. The effluent contains 81.2% by weight of butanols. The high-boiling residue has been reduced to 18.4% by weight.

EXAMPLE 5

Under the conditions of Example 3, 400 ml/hr of the same mixture are passed through a catalyst manufactured according to Example 2. The effluent contains 86.1% by weight of butanols. The high-boiling residue has been reduced to 14.5% by weight.

EXAMPLE 6

12.5 m$^3$/hr of a mixture of 36.2% by weight butyraldehydes, 6.0% by weight butyl formates, 37.1% by weight butanols, and 20.2% by weight high-boiling residue are trickled through two series-connected high-pressure reactors having a total capacity of 9 m$^3$ at a temperature of 205°C, the mixture being trickled firstly through 4 m$^3$ of a catalyst manufactured in accordance with Example 1 and then through 4 m$^3$ of a catalyst manufactured according to Example 2, a hydrogen pressure of 270 atmospheres gauge being maintained. The effluent contains 86.9% by weight of butanols. The high-boiling residue has been reduced to 12.6% by weight.

The catalysts are heated to a temperature of about 450°C for a lengthy period of time during out-of-the-ordinary operating conditions. After operation under normal conditions (250°C) has been resumed the effluent contains 86.5% by weight of butanols and 13.0% by weight of residue. The typical carbonyl number for the residual aldehyde content is only altered from 0.7 mg KOH/g to 1.0 mg KOH/g. After such out-of-the-ordinary operating conditions catalysts of the type known hitherto are no longer usable and must be replaced.

EXAMPLE 7

10.5 m³/hr of a mixture of 82.8% by weight of butyraldehydes, 1.2% by weight of butyl formates, 7.4% by weight of butanols and 8.2% by weight of high-boiling residue are hydrogenated in the same high-pressure reactors and under the same conditions as described in Example 6. The hydrogenation effluent contains 95.6% by weight of butanols and 4.3% by weight of residue.

We claim:

1. In a process for the manufacture of a saturated aliphatic alcohol of 2 to 20 carbon atoms by hydrogenation of an alkanal of 2 to 20 carbon atoms at a temperature of from 140° to 230°C at a pressure of from 50 to 350 atmospheres in the presence of a catalyst containing from 5 to 15% by weight nickel and from 5 to 20% by weight molybdenum, based on the weight of metal plus support, supported on silicic acid, the improvement which comprises using as catalyst a product which has been obtained by heating a silicic acid carrier material to a temperature of from 700° to 1200°C, impregnating the resulting silicic acid carrier material with nickel and molybdenum salts, drying the product, further heating it to a temperature of from 200° to 500°C and subsequently treating the product with hydrogen at elevated temperature.

2. A process as claimed in claim 1 wherein an alkanal of 3 to 14 carbon atoms is used as starting material.

3. A process as claimed in claim 1 wherein an oxo reaction mixture containing butanols, acetals, esters and ethers as byproducts in addition to butyraldehydes is used as starting material.

4. A process as claimed in claim 1 wherein a temperature of from 150° to 220°C is used.

5. A process as claimed in claim 1 wherein a pressure of from 100 to 300 atmospheres is used.

6. A process as claimed in claim 1 wherein a silicic acid carrier material is used which has been obtained by precipitating silicic acid from a 1 to 5M sodium silicate solution with 10 to 30% by weight strong mineral acid up to a pH of from 6 to 7 provided that an alkaline pH is maintained during the precipitation and washing the precipitated silicic acid.

7. A process as claimed in claim 1 wherein a silicic acid is used which has been heat-treated at a temperature of from 1000° to 1100°C.

8. A process as claimed in claim 1 wherein a silicic acid which has a water uptake of from 0.5 to 1.0 cm³/g after being heated to a temperature of from 700° to 1200°C is used.

9. A process as claimed in claim 1 wherein the silicic acid carrier material is impregnated more than once with the nickel and molybdenum salts.

* * * * *